US012441355B1

(12) United States Patent
Chen et al.

(10) Patent No.: US 12,441,355 B1
(45) Date of Patent: Oct. 14, 2025

(54) GENERATING COMPOSITE DATA USING LONG AND SHORT TIME-OF-FLIGHT EXPOSURES

(71) Applicant: Zoox, Inc., Foster City, CA (US)

(72) Inventors: Yongzhe Chen, San Jose, CA (US); Arvind Shivu Govinday, Fairfax, VA (US); Samuel Russell Holladay, San Francisco, CA (US); Robert Nicholas Moor, San Mateo, CA (US); Jonathan Solheim, Santa Clara, CA (US); Shaminda Subasingha, San Ramon, CA (US); Wuyang Yu, Sunnyvale, CA (US)

(73) Assignee: Zoox, Inc., Foster City, CA (US)

( * ) Notice: Subject to any disclaimer, the term of this patent is extended or adjusted under 35 U.S.C. 154(b) by 242 days.

(21) Appl. No.: 17/977,918

(22) Filed: Oct. 31, 2022

(51) Int. Cl.
   *G06V 20/58* (2022.01)
   *B60W 60/00* (2020.01)

(52) U.S. Cl.
   CPC .......... *B60W 60/001* (2020.02); *G06V 20/58* (2022.01); *B60W 2420/403* (2013.01); *B60W 2420/408* (2024.01)

(58) Field of Classification Search
   CPC .............. G06V 20/58; B60W 60/001; B60W 2420/403; B60W 2420/408; H04N 25/533
   See application file for complete search history.

(56) References Cited

U.S. PATENT DOCUMENTS

| | | | | |
|---|---|---|---|---|
| 9,672,635 B2 * | 6/2017 | Einecke | ................... | G06T 7/593 |
| 10,115,034 B2 * | 10/2018 | Hong | ...................... | H04N 23/73 |
| 10,368,053 B2 * | 7/2019 | Martinez Bauza | .. | H04N 13/207 |
| 10,830,894 B2 * | 11/2020 | Karadeniz | ............. | G01S 17/894 |
| 11,019,274 B2 * | 5/2021 | Xu | ......................... | H04N 23/74 |
| 11,450,026 B2 * | 9/2022 | Lee | ........................... | G06T 7/73 |
| 11,726,186 B2 * | 8/2023 | Subasingha | ............. | G01S 17/89 |
| | | | | 356/5.01 |

(Continued)

FOREIGN PATENT DOCUMENTS

| CN | 102415088 A * | 4/2012 | ............... G06T 5/50 |
|---|---|---|---|
| JP | 3530696 B2 * | 5/2004 | |
| JP | 2014220717 A * | 11/2014 | |

OTHER PUBLICATIONS

J.M. Gottfried et al., "Time of Flight Motion Compensation Revisited," 2014 IEEE International Conference on Image Processing (ICIP), Paris, France, 2014, pp. 5861-5865. (Year: 2014).*

(Continued)

*Primary Examiner* — Dino Kujundzic
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can return unreliable pixels, e.g., in the case of over-exposure or saturation. In some examples, composite sensor data can be generated based on information from multiple exposures captured at different exposure times. In examples, pixels in a first exposure are matched to pixels in a second exposure to account for relative movement of the vehicle and the detected object in the composite sensor data.

20 Claims, 5 Drawing Sheets

(56) References Cited

U.S. PATENT DOCUMENTS

| | | | | |
|---|---|---|---|---|
| 11,841,438 B2* | 12/2023 | Subasingha | ............ | G01S 7/4868 |
| 2003/0151689 A1* | 8/2003 | Murphy | ............... | H04N 23/741 |
| | | | | 348/E5.078 |
| 2009/0129634 A1* | 5/2009 | De Waele | ................. | G06T 5/50 |
| | | | | 382/107 |
| 2013/0038698 A1* | 2/2013 | Yoshida | .................... | G06T 7/97 |
| | | | | 348/47 |
| 2015/0125091 A1* | 5/2015 | Gallo | ......................... | G06T 3/14 |
| | | | | 382/275 |
| 2016/0234474 A1* | 8/2016 | Zhang | .................. | H04N 13/128 |
| 2017/0287187 A1* | 10/2017 | Korzunov | ............... | G06T 7/248 |

OTHER PUBLICATIONS

Machine translation of CN 102415088 A (Year: 2012).*
Machine translation of JP 2014220717 A (Year: 2014).*
Machine translation of JP 3530696 B2 (Year: 2004).*

* cited by examiner

GENERATING COMPOSITE DATA USING LONG AND SHORT TIME-OF-FLIGHT EXPOSURES

BACKGROUND

Time-of-flight sensors may be unreliable in certain environments, including environments with varied lighting and/or environments containing objects with different reflective and absorptive properties. For instance, when light from a time-of-flight sensor reflects off highly-reflective objects, such as retroreflectors, pixels on the sensor can become saturated, resulting in unreliable pixel data. Saturated pixels can make it difficult, and in some instances impossible, to infer any information about the scene. When the time-of-flight sensor is intended for use on an autonomous vehicle, unreliable data can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
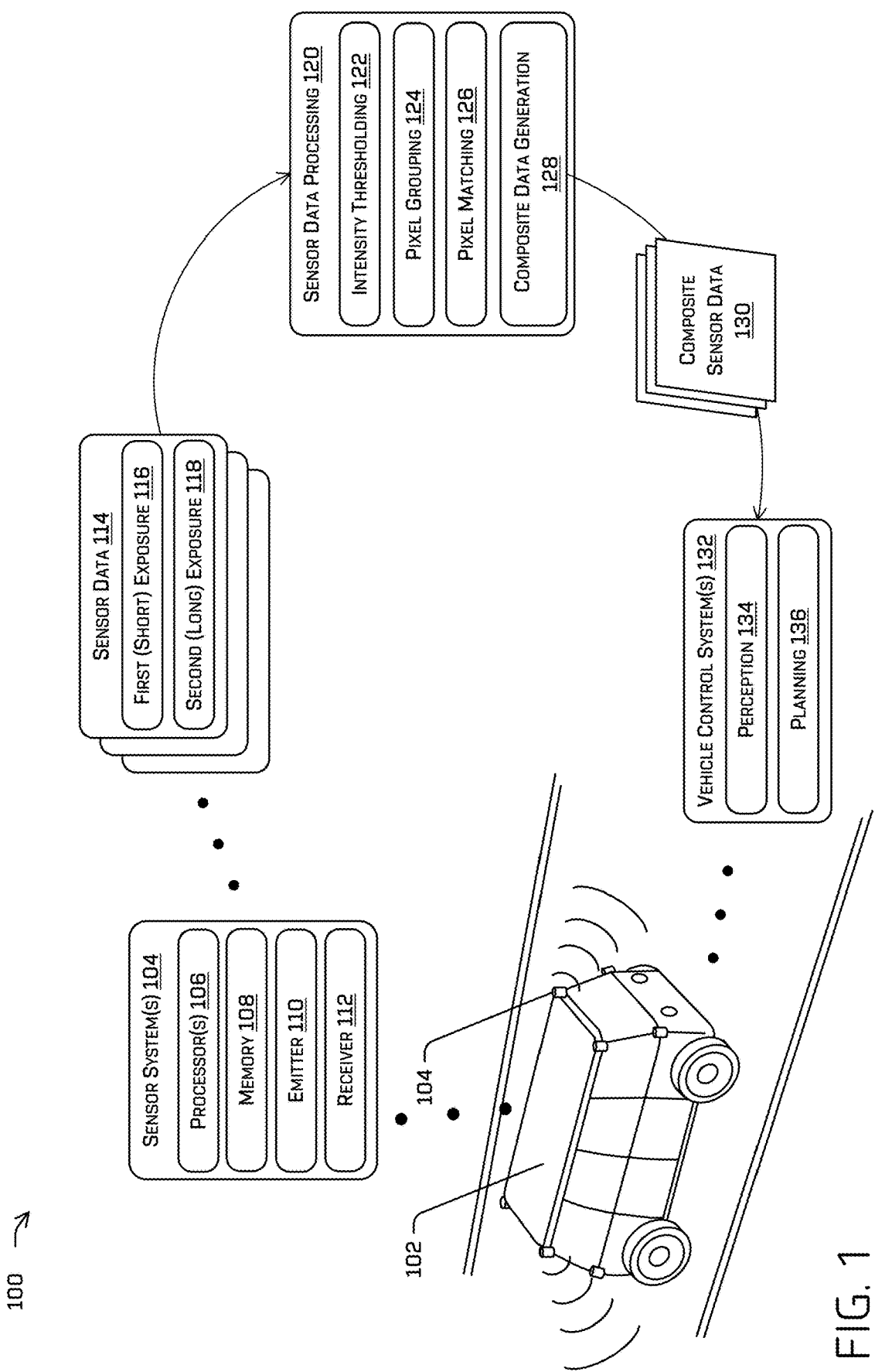
FIG. 1 is a schematic illustration showing an example vehicle, such as an autonomous vehicle, and example components and functionality of a sensor system associated with the vehicle, as described herein.

This disclosure describes methods, apparatuses, and systems for generating sensor data that can be used to identify objects in an environment and to control a vehicle relative to those identified objects. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for robustness purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances, intensity and distance information generated by time-of-flight sensors may be unreliable due to one or more of oversaturation, glare caused by highly reflective objects, pixel noise from stray light, under exposure, ambiguous returns, and/or the like. Techniques described herein can be used to improve sensor data, including time-of-flight sensor returns. For example, techniques disclosed herein may generate composite data from multiple exposures taken by a time-of-flight sensor. Generating composite sensor data according to techniques described herein can provide improved sensor data. Improved sensor data may result in a better understanding of the environment of the sensor, and, when the sensor is associated with a vehicle, techniques described herein can lead to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation to determine the sensor data in an unprojected format to project each pixel in the sensor data into a multi-dimensional space (e.g., 3D-space using an x-position, a y-position, and a z-position).

In implementations described herein, a sensor, such as a time-of-flight sensor, can be configured to generate multiple exposures, including a first exposure and a second exposure. For example, the first exposure and the second exposure may be captured at different exposure (or integration) times. In some examples, the first exposure is a short exposure, e.g., with a relatively shorter exposure time, and the second exposure is a long exposure, e.g., with a relatively longer exposure time. For example, the exposure time for the second (long) exposure may be on the order of from about 4 to about 10 times the exposure time of the first (short) exposure. In other examples, the first exposure may be captured at a first illumination power and the second exposure may be captured at a second illumination power. For instance, the first exposure may be captured at a relatively lower illumination power than the second exposure. Of course, other parameters (such as frequencies of emission, etc.) are contemplated as varying between exposures. The sensor may be configured to capture the first exposure in a manner such that very few or no pixels are saturated, whereas, in the second exposure, the possibility for saturated pixels is higher. In some examples, the first exposure can be captured at an exposure time that is a fraction of the exposure time associated with the second exposure.

The first exposure and the second exposure may be captured serially by the time-of-flight sensor. As a result, when the sensor is mounted on a moving object, e.g., an autonomous vehicle, or a detected object is moving relative to the sensor, locations of detected objects will not line up in the exposures. Thus, for example, when a plurality of pixels in the long exposure are saturated, e.g., because they are associated with a highly-reflective object, like a retroreflector, the corresponding pixels in the short exposure, which are not saturated, may not align positionally with the saturated pixels. Thus, attempts to blend the first and second exposures may result in offset errors. Some conventional systems have assumed that any relative movement between exposures is nominal, and thus these systems have taken no action to correct for this relative movement. However, the present disclosure provides techniques for correcting for offsets caused by relative movement of a sensor and a detected object.

In some implementations, the techniques described herein identify pixels in the short exposure, e.g., pixels that are associated with highly-reflective objects. In examples, the pixels are pixels having an intensity value equal to or greater than a threshold intensity. For example, because the short exposure has lower power and/or a lower exposure time, only highly-reflective objects are likely to provide high intensity returns. Thus, the techniques described herein can identify these pixels using intensity thresholding. In some instances, the identified pixels can be grouped, e.g., as a group, patch, or subset of pixels having a defined shape, feature, or the like. In some examples, the techniques described herein can also identify pixels, or groups of pixels, in the second, long exposure that correspond to saturated pixels. Without limitation, the second pixels in the long exposure can be identified using intensity thresholding and/or using a saturation map.

In some implementations, the techniques described herein match the pixels identified in the short exposure to pixels in the second, long exposure. For example, the pixels may be matched using cross-correlation, feature matching, edge matching, and/or other image processing techniques. In still further examples, the pixels can be matched using depth mapping, e.g., using depth images generated by the time-of-flight sensor for the first exposure and the second exposure.

The techniques described herein also include generating composite data based on the first and second exposures. The composite data corrects for relative movement occurring between the exposures. In some examples, data associated with the pixels identified in the first, short exposure, can replace data for the saturated pixels in the second, long exposure, e.g., at the appropriate locations of the saturated pixels. The composite data can include an intensity image and/or a depth image, as well as additional information generated by the time-of-flight sensor(s).

In some examples, composite data generated using the techniques described herein may be provided to, received by, or otherwise accessed by a computing device of an autonomous vehicle. For instance, the autonomous vehicle may use the image data to determine one or more trajectories for proceeding relative to objects determined from the filtered data. In some instances, depth and/or intensity information identified according to filtering techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve sensor data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited application in autonomous vehicles. For example, any system in which inconsistent sensor data exists, e.g., caused at least in part by glare, may benefit from the techniques described. By way of non-limiting example, techniques described herein may be used on aircrafts, e.g., to correct intensities and/or depths associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-5 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through an environment and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road marking, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable by the processor(s) 106 to cause the sensor system(s) 104 to perform functions including composite data generation from multiple exposures, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

The sensor system(s) 104 can also include an emitter 110 and a receiver 112. In the example of FIG. 1, the sensor system(s) 104 may include a time-of-flight sensor, and the emitter 110 may be configured to emit a carrier (e.g., a signal) and the receiver 112 may be configured to receive, e.g., capture, a response carrier (e.g., a response signal). The response carrier may be the carrier reflected off a surface in the environment. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine intensity values and depth values for each of a plurality of pixels representing a sensed environment and generate the intensity and depth images based on such values.

Aspects of the emitter 110 and/or aspects of the receiver 112 may be configurable. For instance, a modulation frequency and/or an intensity of the carrier emitted by the emitter 110 can be altered. For example, the illumination intensity associated with a carrier emitted by the emitter 110 can be altered by adjusting the voltage and/or frequency input to the emitter 110. Moreover, an integration or exposure time of the receiver 112 may be altered, e.g., by controlling an amount of time over which the receiver 112 collects response carriers. Altering the illumination power and/or the integration time can tune the sensor system(s) 104. For example, higher intensity illumination and/or longer integration times can result in increased performance in relatively lower ambient light environments and/or when the response carrier is from farther away objects and/or objects having lower reflectivity. Lower intensity illumination and/or shorter integration times can result in increased performance in relatively higher ambient light environments and/or when the response carrier is from relatively closer objects and/or objects having higher reflectivity.

As also illustrated in FIG. 1, the sensor system(s) 104 may be configured to output generated data as sensor data 114. For example, the sensor data 114 can include quadrature values, intensity and depth information, or the like. In the illustrated example, the sensor data 114 can include a first exposure 116 and a second exposure 118. As noted above, the emitter 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the first exposure 116 and/or the second exposure 118, e.g., as phase frames. In examples described herein, including below with reference to FIGS. 2 and 3, the sensor system(s) 104 may compute intensity and/or depth values based at least in part on phase values of a plurality of phase frames.

In at least some examples, an instance of the sensor data 114 may include a short exposure, which may include an intensity image and/or a depth image, as the first exposure 116 and a long exposure, which may include intensity information and/or depth information, as the second exposure 118. As detailed further herein, the shorter, first exposure 116 may be associated with a first time, e.g., based on light collected during a first integration time or first exposure time, and the longer, second exposure 118 may be associated with a second time, e.g., based on light collected during a second integration time or second exposure time. In examples, the first time may be less than the second time, such that pixels are unlikely to be saturated in the first exposure. In at least some examples, the first exposure 116 may be generated at an exposure time that is a fraction of the exposure time of the second exposure 118. In one non-limiting example, the first exposure 116 can be captured over a first exposure time on the order of about ten microseconds, and the second exposure 118 can be captured over a second exposure time on the order of about one-thousand microseconds. In other examples, the second exposure time may be on the order of from about 10 times to about 1000 times the first exposure time.

The first exposure 116 and the second exposure 118 may be generated based on serially-collected reflected light. Stated differently, the first exposure 116 may be associated with a first exposure time period and the second exposure 118 may be associated with an immediately adjacent, e.g., immediately before commencement of the first exposure time or immediately after a conclusion of the first exposure time. In some instances, the first exposure 116 and/or the second exposure 118 can include image frames including intensity and depth values calculated using the phase frames. Such image frames can include a stream of serially-generated (e.g., at a predetermined interval) image frames. Generally, each of the image frames may include the same type of data, e.g., data related to the intensity and depth for each of a plurality of pixels comprising the receiver of the sensor. Specifically, the image frames can include a depth image and an intensity image generated by the sensor system(s) 104 and representative of a portion of the environment 100. Similarly, other instances of the image frames can include both an intensity image and a depth image representative of the environment 100 at the corresponding sensing time.

As noted above, different attributes of the environment 100 can result in degraded sensor data quality. For instance, highly reflective objects, such as retroreflectors, can result in saturation of pixels at the receiver 112, especially at longer exposure or integration times. These saturated pixels can be unreliable. Accordingly, techniques described herein can use the first exposure 116 and the second exposure 118 to generate composite sensor data, e.g., a composite intensity image, with significantly fewer (e.g., no) saturated pixels. The composite data allows downstream systems, e.g., planning systems, perception systems, or the like, to better understand a scene. In examples, the settings associated with the emitter 110 and/or the receiver 112, e.g., to reduce the impact of environmental factors, including those just described, on pixel quality. Controlling aspects of the emitter 110 and/or the receiver 112 can provide improved dataset that may better represent the environment and/or may have a higher associated confidence. Moreover, techniques described herein can use the first exposure 116 and the second exposure 118 to filter pixels from the first exposure 116 (and, in some instances, from the second exposure 118) to generated filtered data. For instance, composite data can include reliable information (e.g., intensity and/or depth information) about objects in the environment 100, that is corrected for relative movement between the sensor and sensed objects, as described further herein.

As illustrated in FIG. 1, a sensor data processing system 120 may be configured to receive the sensor data 114 generated by the sensor system(s) 104. In more detail, the sensor data processing system 120 can include an intensity threshold component 122, a pixel grouping component 124, a pixel matching component 126, and a composite data generation component 128. For clarity, the sensor data processing system 120 (and its components) are illustrated separate from the sensor system(s) 104. However, portions of the sensor data processing system 120 may be implemented on the sensor system(s) 104. By way of non-limiting example, the processor(s) 106 may be configured to execute actions associated with the intensity threshold component 122, the pixel grouping component 124, the pixel matching component 126, and/or the composite data generation component 128.

The intensity threshold component 122 can include functionality to determine whether pixels, e.g., individual intensity pixels, have values equal to or above threshold values. For instance, the intensity threshold component 122 can determine pixels in the first exposure 116 that have an intensity value equal to or above a threshold intensity. As noted above, the first exposure 116 may have a relatively low exposure time. For instance, the exposure time may be sufficiently low that very few or no pixels are expected to be saturated or overexposed. Instead, objects that are farther away and/or that have relatively lower reflective properties may not be detected in the first exposure 116. Conversely, highly reflective objects, such as retroreflectors, will result in relatively higher intensity (but not saturated) pixels. Thus, the intensity threshold component 122 can compare pixels in the shorter exposure to an intensity threshold that will identify those pixels that are likely associated with a highly-reflective object in the environment.

In some examples, the intensity threshold component 122 can also include functionality to determine whether pixels, e.g., individual intensity pixels, in the second exposure 118 have values equal to or greater than a threshold intensity. The threshold intensity to which the pixels in the second exposure 118 are compared may be different, e.g., higher, than the threshold to which the pixels in the first exposure 116 are compared. In examples, the intensity threshold component 122 can determine those pixels in the second exposure that are saturated pixels. Thus, for example, the intensity threshold component 122 can determine whether pixels in the second exposure 118 have an intensity corresponding to a saturation value. In at least some examples, the sensor data 114 can include a saturation map that indicates pixels that are saturated in an exposure, e.g., in the second exposure 118. In these examples, the intensity threshold component 122 can also or alternatively determine from the saturation map pixels that are oversaturated.

Generally, the intensity threshold component 122 includes functionality to determine pixels that may be reliable in the first exposure 116, but that are likely (or certain) to have corresponding pixels in the second exposure 118 that are unreliable. In the example of sensing a retroreflective surface, the intensity threshold component 122 identifies pixels in the first exposure 116 associated with the retroreflective surface (e.g., by their relatively high intensity values in the first exposure 116). The intensity threshold component 122 can also identify corresponding pixels in the second exposure 118, that is, pixels in the second exposure 118 associated with the retroreflector (e.g., by identifying the pixels as saturated pixels).

The intensity threshold component 122 may also include functionality to identify unreliable pixels based on other than intensity values and/or a saturation map. For instance, the intensity threshold component 122 can determine unreliable pixels in the second exposure using phase frame information. For example, phase frames can include phase values associated with the response carrier. The response carrier is expected to have properties or characteristics based on the shape of the carrier. By way of non-limiting example, the response carrier may be expected to be a continuous function, e.g., a sinusoid or the like. Accordingly, phase values should represent samples from the function. In one example, e.g., when the function is a sinusoid, the phase values associated with four phase frames taken at a fixed iteration (e.g., 90-degree iterations) should add to zero. Moreover, for four consecutively captured phase frames, the sum of (i) the difference between the third and the first phase values and (ii) the difference between the fourth and the second phase values should also equal zero. When the phase values for individual pixels do not conform to these properties, the intensity threshold component 122 can identify the pixel as unreliable.

The pixel grouping component 124 can include functionality to identify one or more subsets of pixels that are identified by the intensity threshold component 122. For instance, the pixel grouping component 124 can include functionality to group pixels in the first exposure 116 that have intensities equal to or greater than the threshold intensity. For instance, the pixel grouping component 124 can determine a shape of the group and/or generate a patch or bounding box that encompasses the identified pixels. For example, when multiple objects have high reflectivity, e.g., when there are multiple retroreflective surfaces, such as associated with a road sign, a license plate, and/or a fire hydrant, the pixel grouping component 124 can identify multiple subsets of pixels, e.g., in the first exposure 116, with each of the subsets corresponding to one of the objects. The pixel grouping component 124 can similarly group pixels in the second exposure 118. For instance, the pixel grouping component 124 can group saturated pixels as pixel subsets.

The pixel matching component 126 includes functionality to determine a correspondence between pixels in the first exposure 116 and pixels in the second exposure 118. As noted above, detected objects may be positioned differently in the first exposure 116 than in the second exposure 118, because of relative movement of the sensor system(s) 104 and the detected object. Accordingly, pixels in the first exposure 116 that correspond to a sensed object may be different from (e.g., located at different positions than) pixels in the second exposure 118 that correspond to the sensed object. The pixel matching component 126 includes functionality to determine the pixels in the second exposure 118 to which the pixels identified in the first exposure 116 correspond. In examples, and as detailed further herein, the pixel matching component 126 can cross-correlate a group of pixels from the first exposure 116, e.g., as determined by the pixel grouping component 124, with the second exposure 118. This cross-correlation will determine pixels, e.g., a group of pixels having a corresponding size/shape, in the second exposure 118.

The pixel matching component 126 can, in addition to or as alternative to the cross-correlation just described, employ additional techniques to match pixels in the first exposure 116 with pixels in the second exposure 118. For example, the pixel matching component can perform feature matching, e.g., to match a group of pixels in the first exposure 116 with a group of corresponding pixels in the second exposure. Without limitation, the pixel matching component 126 can perform edge matching, shape matching, and/or the like, between pixel groups in the first exposure 116 and pixel groups in the second exposure 118, e.g., as determined by the pixel grouping component 124. Conceptually, when the pixel grouping component 124 has identified one or subsets or groups of pixels in the first exposure 116 that have intensity values above a threshold intensity (e.g., that are associated with a highly-reflective object like a retroreflector) and has identified one or more subsets or groups in the first second exposure 118 that include saturated pixels, the subsets/groups can be matched in the two exposures 116, 118.

In still further examples, the pixel matching component 126 can use additional techniques for matching pixels. As noted above, the first exposure 116 and the second exposure 118 may include depth images, e.g., in addition to intensity images. In examples, the pixel matching component 126 can use depth information from these depth images to determine pixel correspondence. That is, pixels in the first exposure 116 can be mapped to pixels in the second exposure 118 based on depths of those pixels. Additional data, e.g., movement data of the vehicle 102 may also be used to determine depth correspondence. Without limitation, the pixel matching component 126 can receive speed, velocity, and/or other information about movement of the vehicle 102, and determine depth correspondences at least in part based on this additional data. Without limitation, the pixel matching component can predict, based on known and quantified movement of the vehicle 102 (and thus the sensor system(s) 104), a likely depth of a pixel between the first and second exposures 116, 118, and determine correspondence based at least in part on this prediction.

The composite data generation component 128 includes functionality to generate composite sensor data 130 from the first exposure 116 and the second exposure 118. In examples, the second exposure 118, e.g., the long exposure, may be expected to have more complete information about the environment 100 of the vehicle 102. However, as noted above, because of the long exposure time, pixels associated with highly reflective surfaces are more likely to become saturated. The composite data generation component 128 can replace those saturated pixels with values of pixels from the first exposure 116. Thus, for example, the composite data generation component 128 can generate updated data that include values for a subset of the pixels in the first exposure 116 (e.g., the pixels identified by the intensity thresholding component 122) at locations associated with corresponding pixels in the second exposure 118. Thus, for instance, the composite sensor data can include an intensity image that has intensity values determined from the second exposure 118 at most intensity pixels, and that has intensity values determined from the first exposure 116 at pixels corresponding to the oversaturated pixels of second exposure 118. That is, the composite data generation component 128 can generate updated composite sensor data that includes data from both the first exposure 116 and the second exposure, with the composite sensor data correcting for movement, e.g., between the first exposure 116 and the second exposure 118.

As also illustrated in FIG. 1, the composite sensor data 130 may be transmitted to one or more vehicle control systems 132, e.g., for use in controlling the vehicle 102. By way of non-limiting example, the vehicle control system(s) 132 can include a perception system 134 and a planning system 136. In examples, the perception system 134 may receive the composite sensor data 130 and perform one or more of object detection, segmentation, and/or classification to determine objects represented therein. The planning system 136 may determine a trajectory or route for the vehicle 102, e.g., relative to objects perceived by the perception system 134 from the composite sensor data 130.

Providing the vehicle control system(s) 132 with the composite sensor data 130 can improve safety outcomes, e.g., relative to providing the vehicle control system(s) 132 with the first exposure 116, the second exposure 118, and/or blended information from the first exposure 116 and the second exposure 118. In at least some examples, time-of-flight sensors may be used on vehicles, such as the vehicle 102, to provide critical information about objects immediately surrounding the vehicle 102. Thus, providing the composite sensor data 130 without saturated pixels (and as a single intensity image) can streamline processing, further increasing the speed at which these critical functions can be performed.

Figure 2:
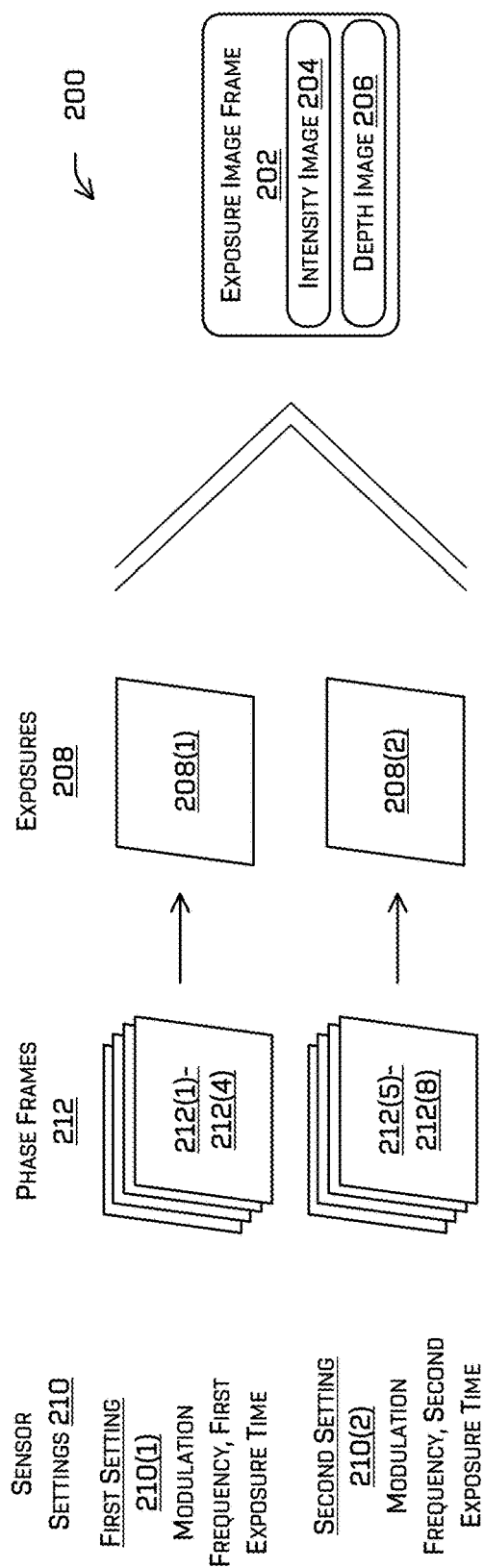
FIG. 2 is a schematic diagram illustrating aspects of sensor data generation at a sensor, such as a time-of-flight sensor, as described herein.

FIG. 2 is a schematic diagram 200 illustrating aspects of a sensor system, such as the sensor system(s) 104 described above. More specifically, the diagram 200 illustrates aspects of data capture conceptualizing how different types of data, in particular an exposure image frame 202 may be generated by the sensor, which may be a time-of-flight sensor. In this example, the exposure image frame 202 includes an intensity image 204 and a depth image 206. The intensity image 204 can include per-pixel intensity values, and the depth image 206 can include per-pixel depth values. For instance, positions of the pixels can correspond to pixel position in the receiver 112 of the sensor system(s) 104 discussed above. Although illustrated as including only the intensity image 204 and the depth image 206, the image frame 202 can include additional information, including but not limited to reflectivity information and/or confidence information. The illustrated exposure image frame 202 may be a single iteration of information (e.g., depth and intensity) corresponding to a sensed environment at a point in time. The image frame may be generated and/or output by the sensor at a predetermined interval, e.g., 10 Hz.

As illustrated, the exposure image frame 202 can be generated from one or more exposures 208. In the illustration, the exposures 208 include a first exposure 208(1) and a second exposure 208(2). In this example, the first exposure 208(1) may correspond to the first exposure 116, discussed above, and the second exposure 208(2) may correspond to the second exposure 118. Although two exposures are illustrated, more or fewer may be used in examples described herein to generate the first exposure image frame 202. In examples, each of exposures 208 may correspond to different sensor settings 210, and the exposures 208(1), 208(2) can be combined or otherwise blended to generate the first exposure image frame 202, e.g., as the composite sensor data 130. In FIG. 2, the sensor settings 210 include a first setting 210(1) having a first, relatively lower (or shorter), exposure time and a second setting 210(2) having a second, relatively higher (or longer), exposure time. Although the settings 210 are illustrated has having different exposure times, in other examples a similar effect may result from changing an illumination power or intensity between the exposures 208. Of course, these are example settings only. As detailed herein, a resolved frame, which may correspond to the exposure image frame 202, may include blended intensity determined using multiple exposures (or frames of data) at different integration times and/or different illumination intensities. Moreover, and as illustrated in FIG. 1., the first setting 210(1) and the second setting 210(1) may have the modulation frequencies, which may be the same or different. In some examples, exposures that are generated at different frequencies can be used to facilitate determination of disambiguated depths using multiple frames of data, e.g., to generate the depth image 206. For example, the resolved frame may also include a blended depth map, determined from multiple exposures.

As also illustrated in FIG. 2, each of the exposures 208 may be based at least in part on a plurality of phase frames 212. More specifically, the phase frames 212 may include the raw data, e.g., a phase value of the return carrier, received at the sensor. In the example, each of the exposures 208 may be based on four phase frames. In the example, the first exposure 208(1) is generated from the phase frames 212(1)-212(4) and the second exposure 208(2) is generated from the phase frames 212(5)-212(8). In examples, the phase frames 212 are used to model the return carrier and a correlation function may be generated based on the carrier and the model. The four values associated with phase frames are four points on the correlation function. Although FIG. 2 illustrates that each of the exposures 208 is generated from four of the phase frames 212, more or fewer (e.g., as few as two) phase frames 212 may be used in implementations.

Accordingly, FIG. 2 illustrates that the exposure image frame 202, which may be the composite sensor data 130, includes an intensity image 204 and/or a depth image 206 can be generated from a plurality of serially-captured exposures (e.g., the exposures 208(1), 208(2)). For instance, because the exposures 208(1)-208(2) are captured at different settings of the time-of-flight sensor, certain exposures may provide more reliable information for certain aspects of the field of view. By way of non-limiting example, the higher-power settings associated with the second setting 210(2) may result in saturated pixels, but fewer (or none) of those pixels may be saturated at the lower power settings associated with the first settings 210(2). Additional aspects of combining time-of-flight sensor data are detailed in U.S. Pat. No. 10,830,894, issued Nov. 10, 2020 and entitled "Intensity and Depth Measurements in Time-of-Flight Sensors," the entirety of which is hereby incorporated by reference. For example, that patent describes aspects of combining multiple exposure generated at different settings to generate intensity images and/or depth images. For instance, that patent describes using intensity data to disambiguate depth values.

Figure 3:
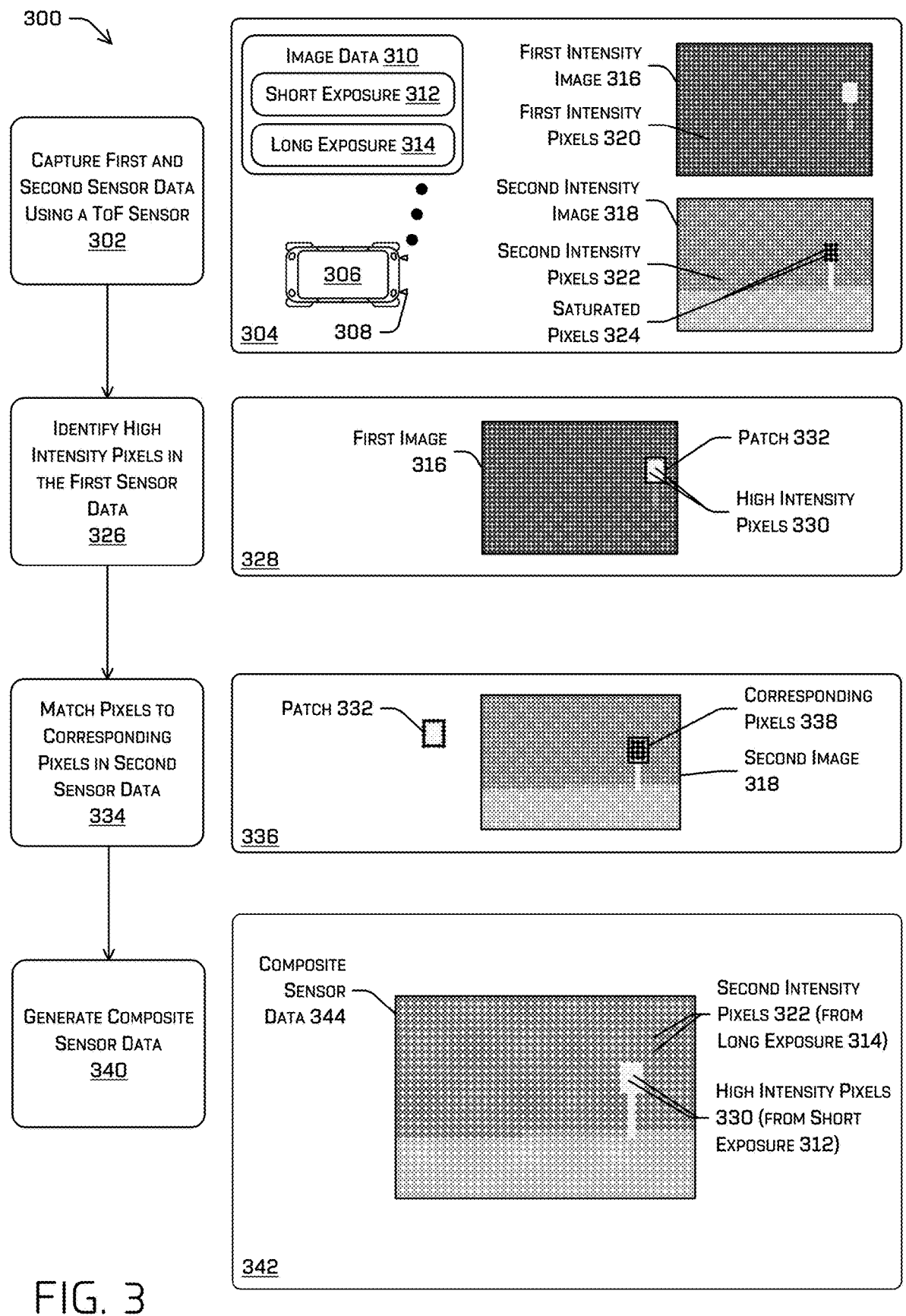
FIG. 3 is a pictorial flow chart illustrating aspects of composite sensor data generation at a sensor, such as a time-of-flight sensor, as described herein.

FIG. 3 includes textual and graphical flowcharts illustrative of a process 300 for generating composite data from multiple exposures of a time-of-flight sensor, according to implementations of this disclosure. For example, the process 300 can be implemented using components and systems illustrated in FIG. 1 and described above, although the process 300 is not limited to being performed by such components and systems. Moreover, the components and systems of FIG. 1 are not limited to performing the process 300.

In more detail, the process 300 can include an operation 302 that includes capturing first and second sensor data using a time-of-flight sensor. As noted above, techniques described herein may be particularly applicable to use with time-of-flight sensors, and the example of FIG. 3 uses time-of-flight sensors as one specific example. The disclosure is not limited to use with time-of-flight sensors, as techniques described herein may be applicable to other types of sensors that may produce saturated pixels or are otherwise effected by overexposure. In some examples, the operation 302 can include receiving both depth and intensity data measured by the time-of-flight sensor and/or multiple exposure generated by the time-of-flight sensor.

An example 304 accompanying the operation 302 illustrates a vehicle 306, which may be the vehicle 102 in some examples. One or more time-of-flight sensors 308 are mounted on the vehicle 306, e.g., to sense an environment surrounding the vehicle 102. For instance, the time-of-flight sensor(s) 308 may be arranged to sense objects generally in a direction of travel of the vehicle 306, although the sensors may be otherwise disposed and more or fewer sensors than the two illustrated may be present. As noted above, the time-of-flight sensor(s) 308 may be specifically configured to detect objects relatively close, e.g., within about 4 meters or less, to the vehicle 306. The time-of-flight sensor(s) 308 may be configured to generate image data 310, including a first, short exposure 312 and a second, long exposure 314. The short exposure 312 may correspond to the first exposure 116 and/or the first exposure 208(1), and the long exposure 314 may correspond to the second exposure 118 and/or the second exposure 208(2) discussed above.

The exposures 312, 314 can include depth information and/or intensity information. In the illustrated example 304, the first exposure 312 can include or be embodied as a first intensity image 316, and the second exposure 314 can include or be embodied as a second intensity image 318. As also illustrated in the example 304, the intensity images 316, 318 can represent an intensity (e.g., brightness) of sensed objects in the scene on a pixel-by-pixel basis. More specifically, the first intensity image 316 includes an array of first intensity pixels 320, e.g., corresponding in location to individual pixels of a receiver (e.g., the receiver 112) of the time-of-flight sensor(s) 308 during the short exposure 312. Similarly, the second intensity image 318, associated with the long exposure 314, includes an array of second intensity pixels 322, e.g., corresponding in location to individual pixels of the receiver of the time-of-flight sensor during the long exposure 314. In the intensity images 316, 318 relatively lighter pixels may represent higher intensity and relatively darker pixels may represent lower intensity. In the example, black pixels represent saturated pixels. Accordingly, in the example 304, most of the first intensity pixels 320 in the first intensity image 316 are relatively low intensity. For example, because the exposure time is so short, only highly-reflective objects will result in relatively high intensities, and other surfaces will return minimal or no light. In contrast, the second intensity image 318, because of the longer exposure time, better represents aspects of the environment. However, the second intensity pixels 322 include saturated pixels 324.

In the example 304, the saturated pixels 324 may result from light reflecting off a retroreflector or other highly-reflective surface. In the example, the surface may be associated with a road sign, for example. The surface also results in the higher intensity (lighter) first intensity pixels 320 in the first intensity image 316. Thus, while the highly-reflective surface causes saturation in the long exposure 314, e.g., resulting in unreliable pixels, the same surface results in the highest-intensity pixels in the short exposure 312. In other examples, the saturated pixels 324 may result from an external light source, e.g., a headlight, the sun, or the like.

As illustrated in the first intensity image 316 and the second intensity image 318, the higher-intensity first intensity pixels 320 and the saturated pixels 324 may correspond in number and arrangement. However, in the respective images 316, 318, these pixels are in different locations. For instance, in the example 304, the higher-intensity pixels are closer to a right edge of the first intensity image 316 than are the saturated pixels 324 to the same right edge of the second intensity image 318. Moreover, the higher intensity pixels in the first intensity image are closer to a top edge of the first intensity image 316 than the saturated pixels 324 are to the same top edge of the second intensity image 318. As will be appreciated, this change in position of the same object results from relative movement of the highly-reflective surface (e.g., the road sign) and the time-of-flight sensor(s) 308. For example, the vehicle 306 may be moving relative to the road sign during generation of the two exposure 312, 314. Aspects of this disclosure include matching the first intensity pixels 320 associated with the highly-reflective object and the saturated pixels 324, e.g., such that the intensity images 316, 318 can be blended or merged as composite data, such as the composite data 130.

At an operation 326, the process 300 includes identifying the high-intensity pixels in the first sensor data. An example 328 accompanying the operation 326 illustrates the first image 316. Also in the example 328, reference numeral 330 is used to indicate the high intensity pixels. As shown, the high intensity pixels are relatively lighter, e.g., near-white, than other of the first intensity pixels 320. As noted above, the high intensity pixels 330 may result from a highly-reflective surface, such as a surface of a retroreflector. The operation 326 can include determining the high intensity pixels 330 based at least in part on a threshold intensity. For instance, the high intensity pixels 330 may be determined as pixels having an intensity value above a threshold intensity. For example, the operation 326 can be implemented by the intensity threshold component 122.

As also illustrated in the example 328, in addition to identifying the high intensity pixels 330, the operation 326 can also include grouping the high intensity pixels 330. For example, the example 328 illustrates a patch 332 comprising the high intensity pixels. The patch 332 may be a bounding box, e.g., a two-dimensional bounding box, that includes the high intensity pixels. In some instances the patch 332 may include pixels in addition to the high intensity pixels, e.g., first intensity pixels 320 proximate the high intensity pixels 330. In other instances, the patch 332 may be a predetermined size and/or shape. In examples, the patch 332 may be identified by the pixel grouping component 124.

At an operation 334, the process 300 can also include matching the high intensity pixels to corresponding pixels in the second sensor data. As noted above, the high intensity pixels 330 in the short exposure 312 correspond to the saturated pixels 324 in the long exposure 314. However, because the exposure are generated at different times, when the vehicle 306 is moving relative to the object that resulted in the saturated pixels 324 and the high intensity pixels 330, the high intensity pixels 330 and the saturated pixels 324, will be in different locations in the images 316, 318, despite being associated with the same object. The operation 334 matches the high intensity pixels 330 with the saturated pixels 324. In an example 336 accompanying the operation 334, the patch 332 is compared to the second intensity image 318 to match the patch 332 to a corresponding portion (e.g., a portion corresponding in size) of the second image 318. In example, the matching can be done via a cross-correlation function, e.g., in which a values associated with the patch 332 are multiplied by corresponding values in regions of the second image 318. In this example, the maximum product will be obtained when the patch 332 is compared to a patch of corresponding pixels 338 that includes the saturated pixels 324. Thus, the process 300 can include identifying pixels in the short exposure 312, e.g., the high intensity pixels 330, that are associated with a highly-reflective object (and thus likely to be saturated in the long exposure 314), and find the corresponding pixels 338 (and the corresponding locations of the corresponding pixels 338) in the long exposure 314.

Although the operation 334 contemplates matching the high intensity pixels 330 with the corresponding pixels 338 via cross-correlation, other techniques for finding (and/or locating) the corresponding pixels 338 also are contemplated. In one example, in addition to identifying the high intensity pixels in the first sensor data, the saturated pixels may also be identified in the second sensor data, e.g., prior to matching. Such identification may be implemented using thresholding techniques and/or using a saturation map. In examples, the identified high intensity pixels 330 may be matched to the corresponding pixels 338 via one or more matching techniques, including but not limited to, feature matching (e.g., edge matching), shape matching, and/or the like. In other examples, the matching can be done using other information about the pixels, such as depth information. As noted above, the sensor data can include both image and depth information, and the depth information may be used to match pixels. Matching using the depth information may also include accounting for relative movement in the axial (depth) direction.

At an operation 340, the process 300 includes generating composite sensor data. As noted above, the long exposure 314 generally provides better (or more complete and/or reliable) image information than the short exposure 312, but highly-reflective objects can result in saturated or overexposed pixels in the long exposure 314. Thus, aspects of this disclosure include generating sensor data that provides improved intensity information at the positions of the saturated pixels in the long exposure 314. The identification of the high intensity pixels 330 and the matching of those pixels to the corresponding pixels 338 allows for replacement of the saturated pixels with information about the high intensity pixels 330. An example 342 accompanying the operation 340 illustrates composite sensor data 344 that includes the high intensity pixels 330 (e.g., from the short exposure 312) at locations associated with the saturated pixels 324 in the long exposure 314. At positions other than the positions of the saturated pixels 324, the composite sensor data 344 can include the second intensity pixels 322. Thus, according to aspects of this disclosure, intensity values from two exposures are blended or combined to form an overall improved representation of the scene, and the effects of relative movement are accounted for in the blending.

Figure 4:
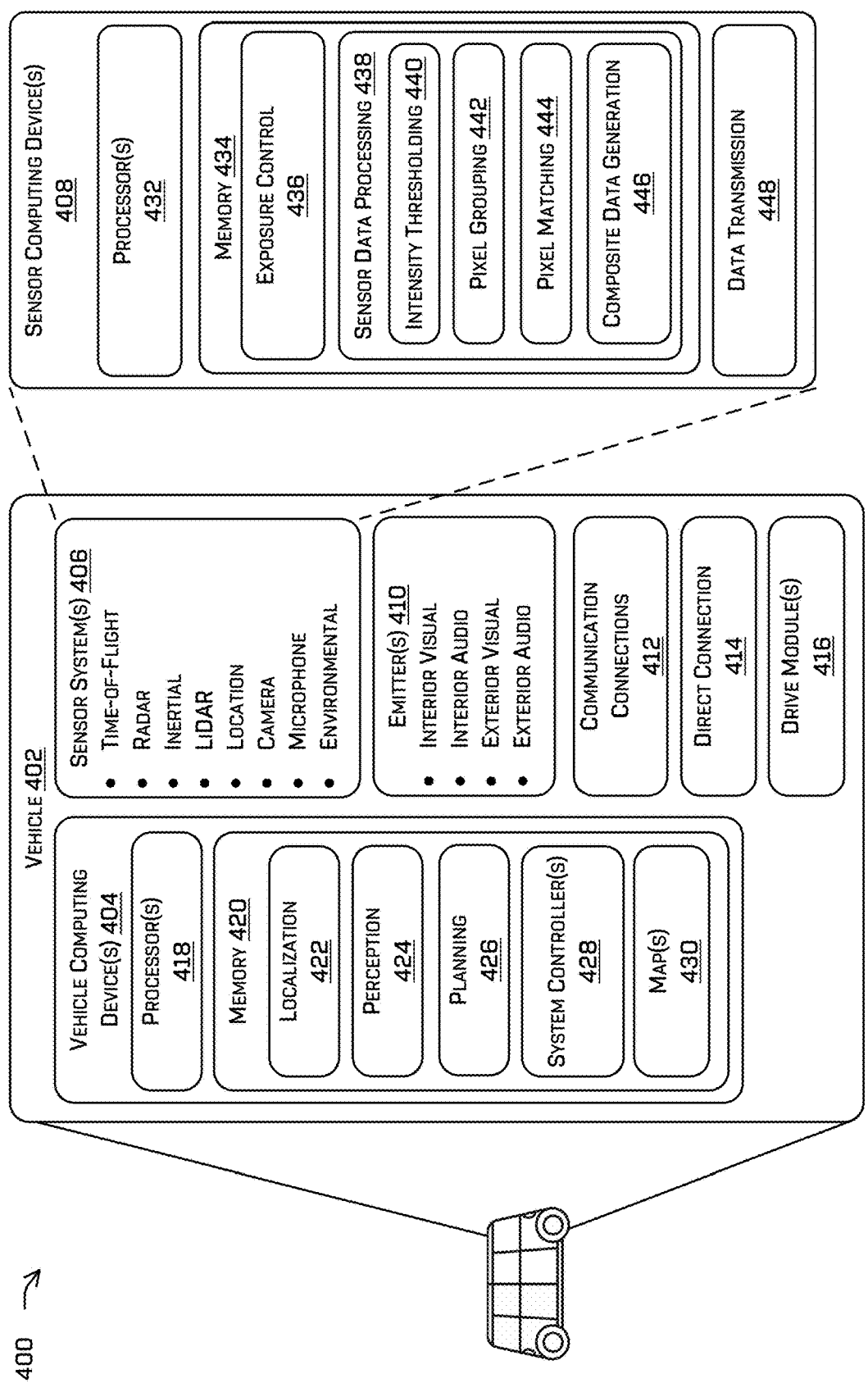
FIG. 4 depicts a block diagram of an example computing system for controlling sensors, such as time-of-flight sensors, using multiple exposures, as described herein.

FIG. 4 depicts a block diagram of an example system 400 for implementing the techniques discussed herein. In at least one example, the system 400 can include a vehicle 402, which can be similar to (or the same as) the vehicle 102 described above with reference to FIG. 1. In the illustrated example 400, the vehicle 402 is an autonomous vehicle; however, the vehicle 402 can be any other type of vehicle.

The vehicle 402 can include one or more vehicle computing devices 404, one or more sensor systems 406, which may include one or more sensor computing devices 408, one or more emitter(s) 410, one or more communication connections 412, at least one direct connection 414 (e.g., for physically coupling with the vehicle 402 to exchange data and/or to provide power), and one or more drive modules 416. In some instances, the vehicle 402 can include more or fewer instances of the vehicle computing device(s) 404. The sensor system(s) 406 can be configured to capture sensor data associated with an environment. In examples, the sensor system(s) 406 can include the sensor system(s) 104.

The vehicle computing device(s) 404 can include one or more processors 418 and memory 420 communicatively coupled with the one or more processors 418. In at least one instance, the processor(s) 418 can be similar to the processor(s) 106 and the memory 420 can be similar to the memory 108 described above with reference to FIG. 1. In the illustrated example, the memory 420 of the vehicle computing device(s) 404 stores a localization component 422, a perception component 424, a planning component 426, one or more system controllers 428, and one or more maps 430. Though depicted as residing in the memory 420 for illustrative purposes, it is contemplated that the localization component 422, the perception component 424, the planning component 426, and/or the system controller(s) 428 can additionally, or alternatively, be accessible to the vehicle computing device(s) 404 (e.g., stored in a different component of vehicle 402 and/or stored remotely).

In at least one example, the localization component 422 can include functionality to receive data from the sensor system(s) 406 to determine a position of the vehicle 402. In examples, received data can include a depth image and/or an intensity image. In other implementations, the localization component 422 can include and/or request/receive a three-dimensional map, e.g., of the map(s) 430 of an environment and can continuously determine a location of the autonomous vehicle within the map. In some instances, the localization component 422 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 402. In some instances, the localization component 422 can provide data to various components of the vehicle 402 to determine an initial position of an autonomous vehicle for generating a candidate trajectory, as discussed herein.

In some examples, the perception component 424 can include functionality to perform object detection, segmentation, and/or classification. In some examples, the perception component 424 can receive data and generate processed sensor data that indicates a presence of an object in the environment of, e.g., proximate, the vehicle 402 and/or a classification of the object as an object type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc.

In some instances, the planning component 426 can determine a path for the vehicle 402 to follow to traverse through an environment. For example, the planning component 426 can determine various routes and trajectories and various levels of detail. In some examples, the planning component 426 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 426 can generate an instruction for guiding the autonomous vehicle along at least a portion of the route from the first location to the second location. In at least one example, the planning component 426 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 426 can alternatively, or additionally, use data from the perception component 424 to determine a path for the vehicle 402 to follow to traverse through an environment. For example, the planning component 426 can receive data from the perception component 424 regarding objects associated with an environment. Using this data, the planning component 426 can determine a route to travel from a first location (e.g., a current location) to a second location (e.g., a target location) to avoid objects in an environment.

As noted above, the vehicle computing device(s) 404 can include the system controller(s) 428, which can be configured to control steering, propulsion, braking, safety systems, emitters, communication systems, and/or other systems of the vehicle 402. The system controller(s) 428 can communicate with and/or control corresponding systems of the drive module(s) 416 and/or other components of the vehicle 402, which may be configured to operate in accordance with a trajectory provided from the planning component 426.

In some examples, the map(s) 430 can be stored on a remote computing device. Multiple maps 430 can be stored based on, for example, a characteristic (e.g., type of entity, time of day, day of week, season of the year, etc.). Storing multiple maps 430 can have similar memory requirements, but increase the speed at which data in a map can be accessed.

In at least one example, the sensor system(s) 406 can be similar to the sensor system(s) 104 described above with reference to FIG. 1. The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The sensor system(s) 406 can provide input to the vehicle computing device(s) 404.

The sensor system(s) 406 can include the sensor computing device(s) 408, which can include one or more processors 432 and memory 434 communicatively coupled with the one or more processors 432. The one or more processors 432 can be similar to the processor(s) 106 and/or to the processor(s) 418, described above. The memory 434 can be similar to the memory 108 and/or to the memory 420, described above. In the illustrated example, the memory 434 of the sensor computing device(s) 408 can store an exposure control system 436 and a sensor data processing system 438. The sensor data processing system 438 can include an intensity thresholding component 440, a pixel grouping component 442, a pixel matching component 444, and a composite data generation component 446. Though depicted as residing in the memory 434 for illustrative purposes, it is contemplated that the foregoing components can additionally, or alternatively, be accessible to the sensor system(s) 406 (e.g., stored in a different component of vehicle 402 and/or stored remotely). Moreover, although the sensor data processing system 438 (as well as its associated components) is illustrated as being stored in and/or part of the sensor computing device(s) 408, in other implementations any or all of these components may be stored in the memory 420 and/or in some other, not illustrated memory, such as a remote memory associated with a remote computing device. That is, although FIG. 4 illustrates several components as being part of the sensor computing device(s) 408 of the sensor system(s) 406, the processing associated with any or all of those components may be performed other than at the sensor.

The sensor system(s) 406 may output raw data, e.g., phase values, as discussed above, for processing in accordance with functionality ascribed herein to one or more of the sensor data processing system 428 or the associated components, but that processing may be performed other than at the location of the emitter and the receiver. Without limitation, the sensor system(s) 406 can include on-board processing capabilities to perform any or all functionality described herein and associated with generating composite data as described herein. Alternatively, processing of the sensor data may be processed other than at the sensor system(s) 406.

Components of the sensor computing device(s) 408 may be configured to generate and/or process data in many formats. For example, and as noted above, the sensor computing device(s) 408 can measure a phase shift between the carrier and the response carrier and/or perform numerical integration calculations to determine the sensor data in the quadrature format. In other examples, the sensor computing device(s) 408 can determine an intensity and depth format of the sensor data, e.g., generate the depth and intensity images. For purposes of illustration only, the sensor system(s) 406 can determine the sensor data in the intensity and depth format where an individual pixel in the sensor data is associated with an 8-bit value for the intensity and a 12-bit value for the depth.

The exposure control system 436 can be configured to generate sensor data, e.g., exposures, at different sensor system settings. In examples described herein, the exposure control system 436 can adjust power, exposure time, and/or the like, to generate a short exposure and a long exposure.

The sensor data processing system 438 can generate composite data from multiple exposures. For instance, the sensor data processing system 438 can correspond to the sensor data processing system 120 detailed above. Without limitation, the sensor data processing system 438 can receive long exposures and short exposures, e.g., including image and/or depth information. The sensor data processing system 438 includes functionality to generate and output composite data from the long and short exposures, as detailed herein.

The intensity thresholding component 440 can include functionality to identify high intensity pixels. For example, in a short exposure, the intensity thresholding component 440 can identify those pixels having an intensity above a threshold intensity. Such pixels may correspond to highly-reflective objects. In a long exposure, the intensity threshold component 440 can identify saturated pixels. The intensity thresholding component 440 can correspond to the intensity thresholding component 122.

The pixel grouping component 442 can include functionality to group pixels identified by the intensity threshold component 440. For example, the pixel grouping component 442 can determine groups of pixels and generate a patch, bounding box, or other representation of such points. Without limitation, the pixel grouping component 442 can correspond to the pixel grouping component 124, discussed above.

The pixel matching component 444 can include functionality to match pixels in multiple exposures. As detailed herein, because there may be relative movement between the sensor system(s) 406 and sensed objects, the location of pixels associated with detected objects may not be the same between exposures. The pixel matching component 444 can match pixels across exposures, regardless of this movement. Without limitation, the pixel matching component 444 can correspond to the pixel matching component 126.

The composite data generation component 446 can correspond to the data generation component 128, discussed above. For example, the composite data generation component 446 can generate an intensity image that includes values from each of multiple exposures.

The sensor computing device(s) 408 of the sensor system(s) 406 can also include a data transmission component 448. The data transmission component 448 can transmit the sensor data, e.g., composite sensor data, from the sensor computing device(s) 408, e.g., to the localization component 422, the perception component 424, and/or the planning component 426.

The emitter(s) 410 are configured for emitting light and/or sound, as described above. In the illustrated example, the emitter(s) 410 can include interior visual and/or interior audio emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 410 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 412 enable communication between the vehicle 402 and one or more other local or remote computing device(s), including the sensor computing device(s) 408. For instance, the communication connection(s) 412 can facilitate communication with other local computing device(s) on the vehicle 402 and/or the drive module(s) 416. Also, the communication connection(s) 412 can allow the vehicle to communicate with other nearby computing device(s) (e.g., other nearby vehicles, traffic signals, etc.). The communications connection(s) 412 can also enable the vehicle 402 to communicate with a remote teleoperations computing device or other remote services.

The communications connection(s) 412 can include physical and/or logical interfaces for connecting the vehicle computing device(s) 404 to another computing device or an external network (e.g., the Internet). For example, the communications connection(s) 412 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the drive module(s) 416 can include a single drive module 416. In other examples, the vehicle 402 can have multiple drive modules, and individual drive modules 416 can be positioned on opposite ends of the vehicle 402 (e.g., the front and the rear, etc.). In at least one example, the drive module(s) 416 can include one or more sensor systems to detect conditions of the drive module(s) 416 and/or the surroundings of the vehicle 402. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 416. In some cases, the sensor system(s) on the drive module(s) 416 can overlap or supplement corresponding systems of the vehicle 402 (e.g., the sensor system(s) 406).

The drive module(s) 416 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 416 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 416. Furthermore, the drive module(s) 416 also include one or more communication connection(s) that enable communication by the respective drive module with one or more other local or remote computing device(s).

The processor(s) 418 of the vehicle 402, the processor(s) 432 of the sensor computing device(s) 408, and/or the processor(s) 106 of the sensor system(s) 104 can be any suitable processor capable of executing instructions to process data and perform operations as described herein. By way of example and not limitation, the processor(s) 418, 432, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420, 434, 108 are examples of non-transitory computer-readable media. The memory 420, 434, 108 can store an operating system and one or more software applications, instructions, programs, and/or data to implement the methods described herein and the functions attributed to the various systems. In various implementations, the memory 420, 434, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 420, 434, 108 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 5:
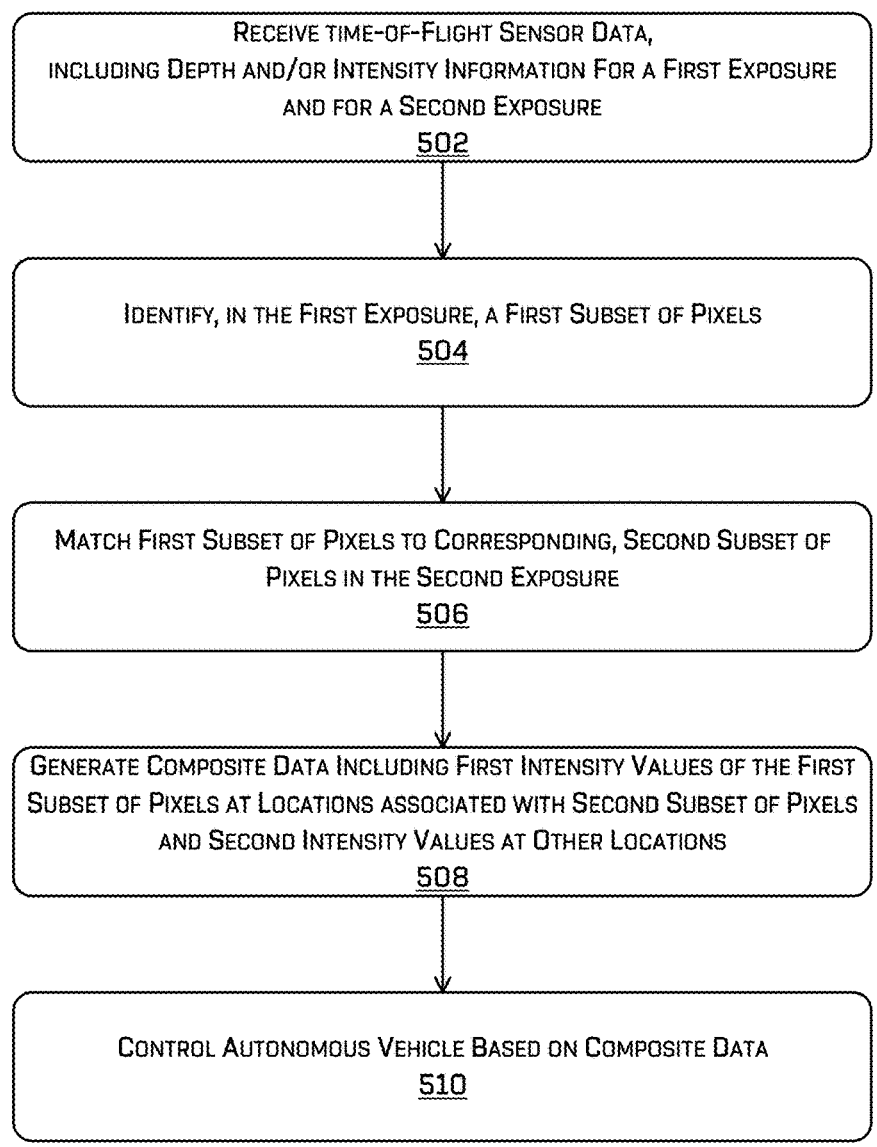
FIG. 5 is a flowchart illustrating an example method for generating composite data and controlling a vehicle relative to obstacles represented in the composite data, as described herein.

FIG. 5 and FIG. 3 discussed above illustrate example processes in accordance with aspects of the disclosure. The process are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 5 depicts an example process 500 for controlling a vehicle, such as an autonomous vehicle using sensor data from a time-of-flight sensor. For example, some or all of the process 500 can be performed by the vehicle 102, the sensor system(s) 104, and/or by one or more components illustrated in FIG. 4, as described herein. For example, some or all of the process 500 can be performed by the sensor computing device(s) 408 of the sensor system(s) 406. However, the process 500 is not limited to being performed by these components, and the components are not limited to performing the process 500.

At an operation 502, the process can include receiving time-of-flight sensor data, including depth and/or intensity information for a first exposure and for a second exposure. The first exposure can be a short exposure, e.g., taken at a relatively lower power and/or having a relatively shorter exposure time. The second exposure can be a long exposure, e.g., taken at a relatively higher power and/or having a relatively longer exposure time. The sensor data may include a depth image containing per-pixel depth values and an intensity image containing per-pixel intensity values. In still further embodiments the sensor data may be a representation of the environment, e.g., an image of the environment, generated using data from the time-of-flight sensor and/or data generated based on the data from the time-of-flight sensor.

At an operation 504, the process 500 can include identifying, in the first exposure, a first subset of pixels. As detailed herein, aspects of this disclosure relate to creating blended or composite sensor data from multiple exposures, e.g., by replacing information associated with saturated pixels in a long exposure with information from pixels in a short exposure. The operation 504 can include identifying pixels that have intensity values equal to or greater than a threshold intensity as the first subset of pixels.

At an operation 506, the process 500 includes matching the first subset of pixels to a corresponding, second subset of pixels in the second exposure. As described herein, the matching can be performed by cross-correlating the first subset of pixels with the second exposure, using featuring matching techniques, and/or shape matching techniques. In still further examples, the matching may be performed based at least in part on depth matching, e.g., by comparing depths of the first subset of pixels to depths of pixels in the second exposure. In some examples, the two exposures may have associated depth information, e.g., a depth image, that includes depth values for pixels. Those depth values may be determined as a nominal depth, e.g., based on the modulation frequency. In other examples, the exposures may have different modulation frequencies, and depth matching may be performed using a disambiguation technique. For example, the techniques described herein can include generating candidate depth values for the identified pixels in the first exposure and generating candidate depth values for pixels in the second exposure. The operation 506 may then include determining a match when two candidate depths are within a threshold depth. In other examples, the exposures may be generated at the same modulation frequency and the depth matching may include determining that nominal depth values of the two exposures are within a threshold depth of each other. In examples, pixels may be matched as a group, e.g., as a patch including a plurality of pixels. The patch may be a bounding box, for example.

At an operation 508, the process 500 can include generating composite data including first intensity values of the first subset of pixels at locations associated with the second subset of pixels and second intensity values at other locations. As detailed herein, composite or blended data can include a resolved intensity image that includes intensity values at pixels from either the first exposure or the second exposure. Specifically, the operation 508 can include associating values from the first exposure with saturated pixels in the second exposure.

At operation 508, the process 500 can include controlling an autonomous vehicle to follow the trajectory. In some instances, a vehicle computing system can, based on the composite data, and in some instances additional sensor data (e.g., LiDAR data, radar data, vision data), determine a trajectory relative to object(s) identified in the composite data. For example, the planning component 426 of the vehicle computing device(s) 404 can further determine relative movement, e.g., velocity and acceleration, of objects in the environment using one or more sensor modalities, object classification data, and the maps and/or other information to determine the trajectory. For example, the trajectory may define at least a portion of a travel path for the vehicle. In some examples, the trajectory and/or travel path may be based at least in part on fused data including data from one or more sensor modalities, including a time-of-flight sensor, LiDAR, radar, or the like. The operation 508 can include generating commands that can be relayed to a controller onboard an autonomous vehicle to control the autonomous vehicle to drive the travel path. Although discussed in the context of an autonomous vehicle, the process 500, and the techniques and systems described herein, can be applied to a variety of systems utilizing sensors.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example vehicle includes: a time-of-flight sensor configured to generate data based on light received at a receiver of the time-of-flight sensor; one or more processors; and memory storing processor-executable instructions that, when executed by the one or more processors, configure the vehicle to perform acts comprising: receiving first sensor data associated with a first exposure generated by the time-of-flight sensor at the first exposure time, the first sensor data comprising first intensity values and first depth values for a plurality of pixels associated with the time-of-flight sensor; receiving second sensor data associated with a second exposure generated by the time-of-flight sensor at a second exposure time, the second sensor data comprising second intensity values and second depth values for the plurality of pixels and the first exposure time being shorter than the second exposure time; determining, in the first exposure, a first subset of the plurality of pixels having first intensity values above a threshold intensity value; determining, in the second exposure, a second subset of the plurality of pixels that are overexposed; matching the first subset of the plurality of pixels to a second subset of the plurality of pixels in the second exposure; and generating composite sensor data comprising an intensity image and a depth image, the intensity image having intensity pixels including first intensity pixels having the first intensity values associated with the first subset of the plurality of pixels at locations associated with the second subset of the plurality of pixels and second intensity pixels having the second intensity values associated with the second subset of the plurality of pixels at locations other than the locations associated with the second subset of the plurality of pixels and the depth image having depth pixels determined based at least in part on at least one of the first depth values or the second depth values.

B: The vehicle of example A, wherein the determining the first subset of the plurality of pixels comprises identifying pixels of the plurality of pixels in the first exposure that have intensity values equal to or exceeding a first threshold intensity value.

C: The vehicle of example A or example B, wherein the determining the second subset of the plurality of pixels that are overexposed comprises identifying pixels of the plurality of pixels in the second exposure that have an intensity value equal to or exceeding a second threshold intensity value.

D: The vehicle of any one of example A through example C, wherein the matching the second subset of the pixels to the first subset of pixels comprises cross-correlating a first patch of the first exposure including the first subset of the plurality of pixels with the second exposure.

E: The vehicle of any one of example A through example D, wherein: the first subset of the plurality of pixels and the second subset of the plurality of pixels are associated with a retroreflective object disposed in an environment; and the vehicle is traversing the environment relative to the retroreflective object.

F: An example method includes: receiving first sensor data corresponding to a first exposure generated by a time-of-flight sensor at a first exposure time; receiving second sensor data corresponding to a second exposure generated by a time-of-flight sensor at a second exposure time longer than the first exposure time; determining a plurality of pixels in the first sensor data having an intensity above a threshold intensity, the plurality of pixels having first pixel positions; matching the first plurality of pixels to corresponding pixels in the second sensor data, the corresponding pixels having second pixel positions different from the first pixel positions; and generating composite sensor data comprising first attributes of the plurality of pixels associated with the second pixel positions and second attributes of the second sensor data at positions other than the second pixel positions.

G: The method of example F, wherein the matching comprises cross-correlating the plurality of pixels to the second sensor data.

H: The method of example F or example G, wherein the cross-correlating the plurality of pixels comprises determining a patch including the plurality of pixels and cross-correlating the patch to the second sensor data.

I: The method of any one of example F through example H, wherein the matching comprises comparing depth data associated with the plurality of pixels to depth values associated with pixels in the second sensor data.

J: The method of any one of example F through example I, wherein the matching comprises: determining at least one of a first edge or a first shape associated with the plurality of pixels; and determining the corresponding pixels based at the at least in part on a similarity of the at least one of the first edge or the first shape to at least one of a second edge or a second shape in the second exposure.

K: The method of any one of example F through example J, further comprising: determining that the corresponding pixels are saturated pixels.

L: The method of any one of example F through example K, wherein the determining that the corresponding pixels are saturated pixels comprises at least one of: determining that intensities of the corresponding pixels exceed a second threshold intensity; or determining a saturation map associated with the second sensor data.

M: The method of any one of example F through example L, wherein the generating the composite sensor data comprises: generating an intensity image having intensity pixels including first intensity pixels having first intensity values associated with the plurality of pixels at locations associated with the corresponding pixels and second intensity pixels having second intensity values associated with the second sensor data at locations other than the locations associated with the corresponding pixels; and generating a depth image having depth pixels generated based at least in part on first depth values from the first sensor data and second depth values from the second sensor data.

N: The method of any one of example F through example M, further comprising: controlling a vehicle based at least in part on the composite sensor data.

O: One or more example non-transitory computer-readable media storing instructions that, when executed, cause one or more processors to perform operations comprising: receiving first sensor data corresponding to a first exposure generated by a time-of-flight sensor at a first exposure time; receiving second sensor data corresponding to a second exposure generated by the time-of-flight sensor at a second exposure time longer than the first exposure time; determining a plurality of pixels in the first sensor data having an intensity above a threshold intensity, the plurality of pixels having first pixel positions; matching the plurality of pixels to corresponding pixels in the first sensor data, the corresponding pixels having second pixel positions different from the first pixel positions; and generating composite sensor data comprising first attributes of the plurality of pixels associated with the second pixel positions and second attributes of the second sensor data at positions other than the second pixel positions.

P: The one or more non-transitory computer-readable media of example O, wherein the matching comprises cross-correlating the plurality of pixels to the second sensor data.

Q: The one or more non-transitory computer-readable media of example O or example P, wherein the matching comprises comparing depth data associated with the plurality of pixels to depth values associated with pixels in the second sensor data.

R: The one or more non-transitory computer-readable media of any one of example O through example Q, wherein the matching comprises: determining at least one of a first edge or a first shape associated with the plurality of pixels; and determining the corresponding pixels based at the at least in part on a similarity of the at least one of the first edge or the first shape to at least one of a second edge or a second shape in the second sensor data.

S: The one or more non-transitory computer-readable media of any one of example O through example R, further comprising determining that the corresponding pixels are saturated pixels based at least in part on at least one of: determining that intensities of the corresponding pixels exceed a second threshold intensity; or determining a saturation map associated with the second sensor data.

T: The one or more non-transitory computer-readable media of any one of example O through example S, wherein the generating the composite sensor data comprises: generating an intensity image having intensity pixels including first intensity pixels having first intensity values associated with the plurality of pixels at locations associated with the corresponding pixels and second intensity pixels having second intensity values associated with the second exposure at locations other than the locations associated with the corresponding pixels.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

We claim:

1. A vehicle comprising:
a time-of-flight sensor configured to generate data based on light received at a receiver of the time-of-flight sensor;
one or more processors; and
memory storing processor-executable instructions that, when executed by the one or more processors, configure the vehicle to perform acts comprising:
receiving first sensor data associated with a first exposure generated by the time-of-flight sensor at a first exposure time, the first sensor data comprising first intensity values and first depth values for a plurality of pixels associated with the time-of-flight sensor;
receiving second sensor data associated with a second exposure generated by the time-of-flight sensor at a second exposure time, the second sensor data comprising second intensity values and second depth values for the plurality of pixels and the first exposure time being shorter than the second exposure time;

determining, in the first exposure, a first subset of the plurality of pixels having the first intensity values above a threshold intensity value;

determining, in the second exposure, a second subset of the plurality of pixels that are overexposed;

matching the first depth values of the first subset of the plurality of pixels in the first exposure generated at the first exposure time to the second depth values of the second subset of the plurality of pixels in the second exposure generated at the second exposure time;

generating, based at least in part on the matching, composite sensor data comprising an intensity image and a depth image, the intensity image having intensity pixels including first intensity pixels having the first intensity values associated with the first subset of the plurality of pixels at first locations and second intensity pixels having the second intensity values associated with the second subset of the plurality of pixels at second locations different from the first locations associated with the first subset of the plurality of pixels, and the depth image having depth pixels determined based at least in part on at least one of the first depth values or the second depth values; and correcting, based at least in part on the composite sensor data, a change in position of the time-of-flight sensor between the first exposure time and the second exposure time.

2. The vehicle of claim 1, wherein the threshold intensity value is a first threshold intensity value, and the determining the first subset of the plurality of pixels comprises identifying pixels of the plurality of pixels in the first exposure that have intensity values equal to or exceeding the first threshold intensity value.

3. The vehicle of claim 2, wherein the determining the second subset of the plurality of pixels that are overexposed comprises identifying pixels of the plurality of pixels in the second exposure that have an intensity value equal to or exceeding a second threshold intensity value different from the first threshold intensity value.

4. The vehicle of claim 1, wherein the matching the second subset of the plurality of the pixels to the first subset of the plurality of pixels comprises cross-correlating a first patch of the first exposure including the first subset of the plurality of pixels with a corresponding patch of the second exposure.

5. The vehicle of claim 1, wherein:
the first subset of the plurality of pixels and the second subset of the plurality of pixels are associated with a retroreflective object disposed in an environment; and
the vehicle is traversing the environment relative to the retroreflective object.

6. A method comprising:
receiving first sensor data corresponding to a first exposure generated by a time-of-flight sensor at a first exposure time;
receiving second sensor data corresponding to a second exposure generated by the time-of-flight sensor at a second exposure time longer than the first exposure time;
determining a plurality of pixels in the first sensor data having an intensity above a threshold intensity, the plurality of pixels having first pixel positions;
matching the plurality of pixels to corresponding pixels in the second sensor data, the corresponding pixels having second pixel positions different from the first pixel positions; and
generating composite sensor data comprising first attributes of the plurality of pixels associated with the second pixel positions and second attributes of the second sensor data at positions different from the second pixel positions;
determining a change in a position of the time-of-flight sensor between the first exposure time and the second exposure time; and
correcting, based at least in part on the composite sensor data, the change in the position of the time-of-flight sensor.

7. The method of claim 6, wherein the matching comprises cross-correlating the plurality of pixels to the second sensor data.

8. The method of claim 7, wherein the cross-correlating the plurality of pixels comprises determining a patch including the plurality of pixels and cross-correlating the patch to the second sensor data.

9. The method of claim 6, wherein the matching comprises comparing depth data associated with the plurality of pixels to depth values associated with the corresponding pixels in the second sensor data.

10. The method of claim 6, wherein the matching comprises:
determining at least one of a first edge or a first shape associated with the plurality of pixels; and
determining the corresponding pixels based at least in part on a similarity of the first edge or the first shape to at least one of a second edge or a second shape in the second exposure.

11. The method of claim 6, further comprising:
determining that the corresponding pixels are saturated pixels.

12. The method of claim 11, wherein the determining that the corresponding pixels are the saturated pixels comprises at least one of:
determining that intensities of the corresponding pixels exceed a second threshold intensity; or
determining a saturation map associated with the second sensor data.

13. The method of claim 6, wherein the generating the composite sensor data comprises:
generating an intensity image including first intensity pixels having first intensity values associated with the plurality of pixels at first locations and second intensity pixels having second intensity values associated with the corresponding pixels in the second sensor data at second locations other than the first locations associated with the plurality of pixels; and
generating a depth image having depth pixels generated based at least in part on first depth values from the first sensor data and second depth values from the second sensor data.

14. The method of claim 6, further comprising:
controlling a vehicle based at least in part on the composite sensor data.

15. One or more non-transitory computer-readable media storing instructions that, when executed, cause one or more processors to perform operations comprising:
receiving first sensor data corresponding to a first exposure generated by a time-of-flight sensor at a first exposure time;

receiving second sensor data corresponding to a second exposure generated by the time-of-flight sensor at a second exposure time longer than the first exposure time;

determining a plurality of pixels in the first sensor data having an intensity above a threshold intensity, the plurality of pixels having first pixel positions;

matching the plurality of pixels to corresponding pixels in the second sensor data, the corresponding pixels having second pixel positions different from the first pixel positions; and generating, based at least in part on the matching, composite sensor data comprising first attributes of the plurality of pixels associated with the second pixel positions and second attributes of the second sensor data at positions different from the second pixel positions;

determining an offset between a first position of the time-of-flight sensor and a second position of the time-of-flight sensor; and replacing, based at least in part on the composite sensor data, overexposed pixel values at the first position with pixels at the second position to correct the offset.

16. The one or more non-transitory computer-readable media of claim 15, wherein the matching comprises cross-correlating the plurality of pixels to the corresponding pixels in the second sensor data.

17. The one or more non-transitory computer-readable media of claim 15, wherein the matching comprises comparing depth data associated with the plurality of pixels to depth values associated with the corresponding pixels in the second sensor data.

18. The one or more non-transitory computer-readable media of claim 15, wherein the matching comprises:
   determining at least one of a first edge or a first shape associated with the plurality of pixels; and
   determining the corresponding pixels based at least in part on a similarity of the first edge or the first shape to at least one of a second edge or a second shape in the second sensor data.

19. The one or more non-transitory computer-readable media of claim 15, further comprising determining that the corresponding pixels are saturated pixels based at least in part on at least one of:
   determining that intensities of the corresponding pixels exceed a second threshold intensity; or
   determining a saturation map associated with the second sensor data.

20. The one or more non-transitory computer-readable media of claim 15, wherein the generating the composite sensor data comprises:
   generating an intensity image including first intensity pixels having first intensity values associated with the plurality of pixels at first locations and second intensity pixels having second intensity values associated with the corresponding pixels in the second exposure at second locations other than the first locations associated with the plurality of pixels.

* * * * *